P. J. McNAMEE.
GROUND GRIPPING DEVICE.
APPLICATION FILED DEC. 15, 1921.
1,430,243.
Patented Sept. 26, 1922.
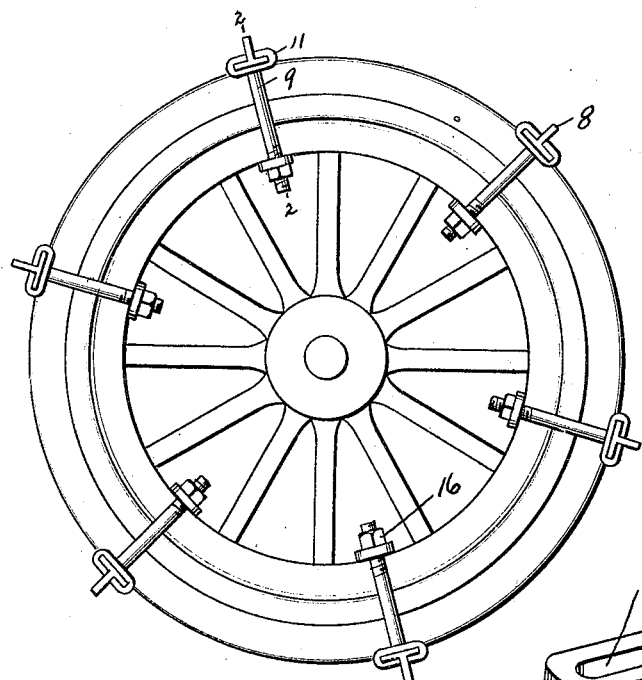
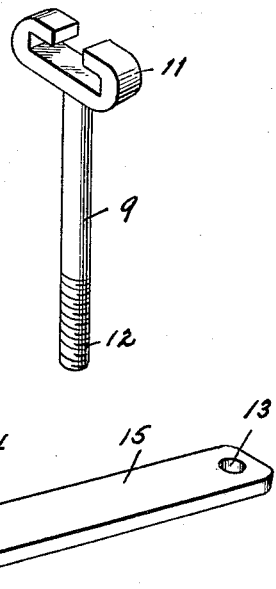
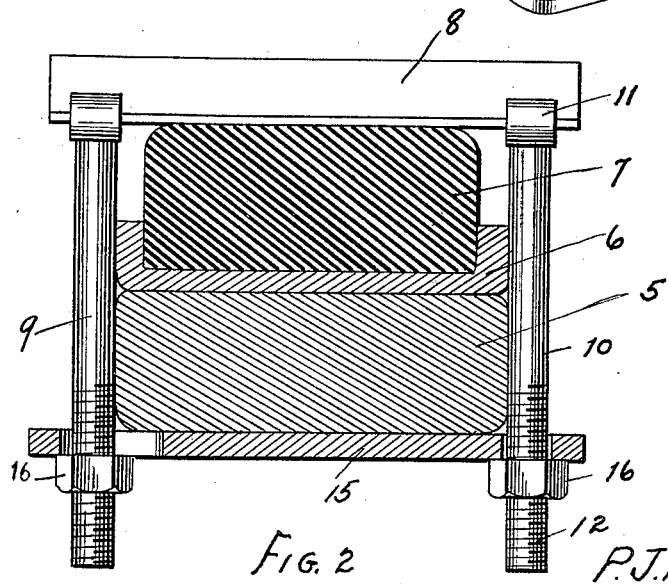
INVENTOR
P. J. McNAMEE
BY
Richard Bowen
ATTORNEY Patented Sept. 26, 1922.

1,430,243

UNITED STATES PATENT OFFICE.

PATRICK J. McNAMEE, OF NEW YORK, N. Y.

GROUND-GRIPPING DEVICE.

Application filed December 15, 1921. Serial No. 522,573.

*To all whom it may concern:*

Be it known that I, PATRICK J. MCNAMEE, a citizen of the United States, residing at New York, in the county of New York and State of New York, have invented certain new and useful Improvements in Ground-Gripping Devices, of which the following is a specification.

This invention relates to ground gripping or anti-slipping devices for motor vehicle wheels and particularly to that class of broad base resilient truck wheels used in general road work.

The primary object of the invention is the provision of a novel and improved vehicle wheel attachment particularly adapted to be mounted on the felly and transversely of the hard rubber tire so as to prevent slipping of the wheel on the frozen ground and snow.

Another and very important object of the invention is the construction of a detachable ground gripping device for motor vehicle wheels and particularly applicable to large-size truck wheels having broad bases wherein some anti-skid chains cannot be employed.

A continued and very important object of the invention is the construction of a non-skid and ground gripping attachment of the type above set forth which is extremely simple in construction, easily assembled, highly efficient in operation, practical, durable, and otherwise capable of being manufactured at an extremely low cost whereby its commercial possibilities are greatly enhanced.

I attain the above objects and others in the accompanying drawings wherein,

Figure 1 is a view of a motor vehicle wheel showing the invention as applied.

Figure 2 is a large sectional view taken on the line 2—2 of Figure 1.

Figure 3 is a detailed view of one of the clamping bolts and,

Figure 4 is a further detailed view of a clamping plate.

Referring now to the drawings wherein like reference characters designate corresponding parts throughout the several views, 5 designates the felly and 6 the rim of a motor vehicle wheel and 7 the tire on which the improved device is adapted to be mounted.

The invention primarily consists of a substantially T-shaped angle plate 8 which may be of any suitable size to meet the requirements or needs depending on the condition of the ground, it being observed that the T-shaped plates are mounted transversely of the tire as clearly shown by Figure 2 of the drawing.

A pair of clamping bolts 9, 10 are adapted for sliding engagement with the T-shaped bar, each of said bolts having a substantially U-shaped head 11 so that the same may be slid on the T-shaped bar 8 from both ends so as to abut the felly and rim of the wheel. The threaded ends 12 of the clamping bolts are adapted to pass through the lock 13 and the elongated lock 14 respectively of the clamping plate 15, such elongated lock 14 of course, permitting adjustment of the bolt 9 so that the device may accommodate various width wheel is readily understood. The nuts 16 when tightened against the clamping plate 15 maintains the device in perfectly rigid condition and consequently prevents movement of the T-shaped bar 8 extending outwardly of the periphery of the resilient tire.

Of course as many of the above devices as desired may be used on the front or rear wheel of the vehicle and in use the T-shaped bar grips the ground and prevents the wheels from slipping. While I have shown the invention as applied to a tire and wheel, it will of course be understood that the device is equally applicable to tractor for use in farming.

In the accompanying drawings, I have illustrated my invention embodied in one form by way of example, and which construction has been found to answer to a satisfactory degree the results to be obtained. It would be manifest, however, that other forms of embodiment may be adopted, and that the construction may be variously changed and modified by the skilled mechanic without departing from the limits of the invention. Further it will be understood that the invention is not limited to any particular form of construction in the parts, except in so far as such limitations are specified in the subject matter being claimed.

Having shown and described my invention what I now claim as new and desire to secure by Letters Patent of the United States is:

1. A ground gripping device of the class described comprising an angle bar, clamping bolts having U-shaped head slidably mounted for adjustment on said angle bar, a clamping plate having slots adjacent each end thereof for receiving said bolts and fastening elements on the bolts for locking said plate and angle bar to the felly and periphery of the wheel respectively.

2. A ground gripping device of the class described comprising a T-shaped bar adapted to extend transversely of a vehicle tire, threaded bolts having U-shaped heads slidably mounted for adjustment on the T-shaped bar to accommodate various width wheels, a flat clamping plate having an aperture at one end thereof and an elongated slot in the opposite end for receiving the threaded bolts, and threaded locking nuts for said bolts for clamping the T-shaped bar in position on the wheel.

In testimony whereof I affix my signature.

PATRICK J. McNAMEE. [L. S.]